US008180491B2

(12) United States Patent
Reid et al.

(10) Patent No.: US 8,180,491 B2
(45) Date of Patent: May 15, 2012

(54) SYSTEMS AND METHODS FOR SOLAR AFFECTED ENVIRONMENTAL CONTROL

(75) Inventors: Lawrence W. Reid, Heber, UT (US); Steven W. Reid, Heber, UT (US)

(73) Assignee: Solar Revolution LLC, Heber, UT (US)

( * ) Notice: Subject to any disclaimer, the term of this patent is extended or adjusted under 35 U.S.C. 154(b) by 714 days.

(21) Appl. No.: 11/681,261

(22) Filed: Mar. 2, 2007

(65) Prior Publication Data
US 2008/0215186 A1 Sep. 4, 2008

(51) Int. Cl.
*G01M 1/38* (2006.01)

(52) U.S. Cl. .......................... 700/276; 700/286; 320/101

(58) Field of Classification Search .......... 700/276–278; 320/101; 165/49
See application file for complete search history.

(56) References Cited

U.S. PATENT DOCUMENTS

| | | | |
|---|---|---|---|
| 3,996,919 A | 12/1976 | Hepp | |
| 4,389,085 A | 6/1983 | Mori | |
| 4,538,218 A | 8/1985 | Watson | |
| 4,556,788 A | 12/1985 | Hanak | |
| 4,561,423 A | 12/1985 | Blasey | |
| 4,890,599 A * | 1/1990 | Eiden | 126/606 |
| 5,022,929 A | 6/1991 | Gallois-Montbrun | |
| 5,204,777 A | 4/1993 | Curshod | |
| 5,221,363 A * | 6/1993 | Gillard | 136/248 |
| 5,818,734 A | 10/1998 | Albright | |
| 6,148,571 A | 11/2000 | Seyller | |
| 6,363,667 B2 | 4/2002 | O'Neill | |
| 6,465,766 B1 | 10/2002 | Zhang | |
| 7,202,457 B2 * | 4/2007 | Janus et al. | 250/203.4 |
| 2002/0180404 A1 * | 12/2002 | Benn et al. | 320/101 |
| 2003/0014161 A1 * | 1/2003 | Orthlieb et al. | 700/277 |
| 2004/0100698 A1 | 5/2004 | Aoki et al. | |
| 2005/0072455 A1 * | 4/2005 | Gerhardinger et al. | 136/243 |
| 2005/0243430 A1 | 11/2005 | Cuttle | |
| 2006/0071087 A1 * | 4/2006 | Kates | 236/1 B |
| 2006/0207730 A1 * | 9/2006 | Berman et al. | 160/310 |
| 2007/0137640 A1 * | 6/2007 | Tarabishi | 126/577 |
| 2008/0167756 A1 * | 7/2008 | Golden et al. | 700/297 |

OTHER PUBLICATIONS

Solar tracker entry in www.wikipedia.com.
http://practicalinstruments.com/—roof mount panel.

* cited by examiner

*Primary Examiner* — Kakali Chaki
*Assistant Examiner* — Nathan Laughlin
(74) *Attorney, Agent, or Firm* — Trent Baker; Baker & Associates PPLC

(57) ABSTRACT

One embodiment of the present invention relates to a solar affected environmental control system. The system includes a set of input devices, a priority device, an output device, and a control module. The input devices measure environmental values such as temperature, light, environmentally generated water heat, and environmentally generated electricity. The priority device interfaces with a user to define a goal that corresponds to a hierarchy of environmental objectives. The output device is an adjustable solar module that has an affect on the environmental values. The control module is an electrical device that includes a mathematical algorithm configured to correlate the environmental values and the user-defined goal so as to generate a set of output device settings. The control module is electrically coupled to the output device to facilitate adjustment according to the output device settings, so as to affect the environmental values in a manner consistent with the goal.

20 Claims, 11 Drawing Sheets

SYSTEMS AND METHODS FOR SOLAR AFFECTED ENVIRONMENTAL CONTROL

FIELD OF THE INVENTION

The invention generally relates to systems and methods for environmental control. In particular, the present invention relates to solar affected environmental control systems and methods of use.

BACKGROUND OF THE INVENTION

The sun transmits energy to the earth in the form of visual light and thermal radiation. This solar energy has numerous potential uses and effects on human civilization. During particular earth-sun orientations, the sun's transmitted visual light reflects off of physical objects, thereby enabling individuals to see, navigate, and differentiate among physical objects. The thermal radiation transmitted by the sun affects the relative temperature at a specific location depending on the earth's axial location with respect to the sun. In an effort to conserve natural resources and optimize energy usage, it is desirable to harness this solar energy for various practical applications. Therefore, these forms of transmitted solar energy are converted via various technologies into other forms of applicable energy, including electrical and hydrothermal. These solar technologies may be categorized as both active solar and passive solar. Active solar technologies incorporate the use of external energy to generate/convert energy from the sun. An example of an active solar device would include a mechanical tracking module coupled to a photovoltaic cell. Whereas, passive solar technology systems utilize the natural thermal transfer properties of the solar energy. Passive solar devices include climate control and water heating systems. Unfortunately, existing active and passive solar technologies fail to provide a system that efficiently utilizes both the visual and thermal properties of solar energy.

People generally prefer residential living environments in which they are able to control aspects of the interior climate. For example, most residential and commercial buildings include some form of heating or cooling device so as to adjust the temperature. These devices may be coupled to a thermostat so as to create a system that automatically turns on one of these devices when it is necessary to adjust the climate to a preferred level. Unfortunately, thermostats generally control the climate based on a single temperature input and therefore fail to consider other forms of data which may be useful in efficiently controlling an environment. In addition, thermostats are generally limited to on/off functionality, meaning that when a specific condition is met, they are capable of turning on or off a device. Thermostat-based systems do not incorporate any form of solar-related data, which may have a substantial effect on the climate of a particular region.

Therefore, there is a need in the industry for an environmental control system that efficiently utilizes multiple forms of environmental data, including solar-related data.

SUMMARY OF THE INVENTION

The present invention relates to systems and methods for environmental control. One embodiment of the present invention relates to a solar affected environmental control system. The system includes a set of input devices, a priority device, an output device, and a control module. The input devices measure environmental values such as temperature, light, environmentally generated water heat, and environmentally generated electricity. The input devices may also be used to measure and record time of day, season, etc. The priority device interfaces with a user to define a goal that corresponds to a hierarchy of environmental objectives. For example, the goal may define temperature, visual light, and then environmentally generated electricity as the hierarchy in which the user wishes to prioritize the environmental objectives. The output device is an adjustable solar module that has an effect on the environmental values. For example, a rotatable skylight mounted panel may have an adjustable effect on both temperature and visual light, depending on the angle of rotation. The control module is an electrical device that includes a mathematical algorithm configured to correlate the environmental values and the user-defined goal so as to generate a set of output device settings. The control module is electrically coupled to the output device to facilitate adjustment according to the output device settings, so as to affect the environmental values in a manner consistent with the goal. A second embodiment of the present invention relates to a method for controlling a set of environmental values, including the acts of receiving environmental values, receiving a user-defined goal corresponding to a priority of environmental objectives, applying an algorithm to correlate the environmental values and the goal to generate a set of solar output device settings, and adjusting a solar output device according to the output device settings so as to affect the environmental values in a manner consistent with the goal.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

Figure 1:
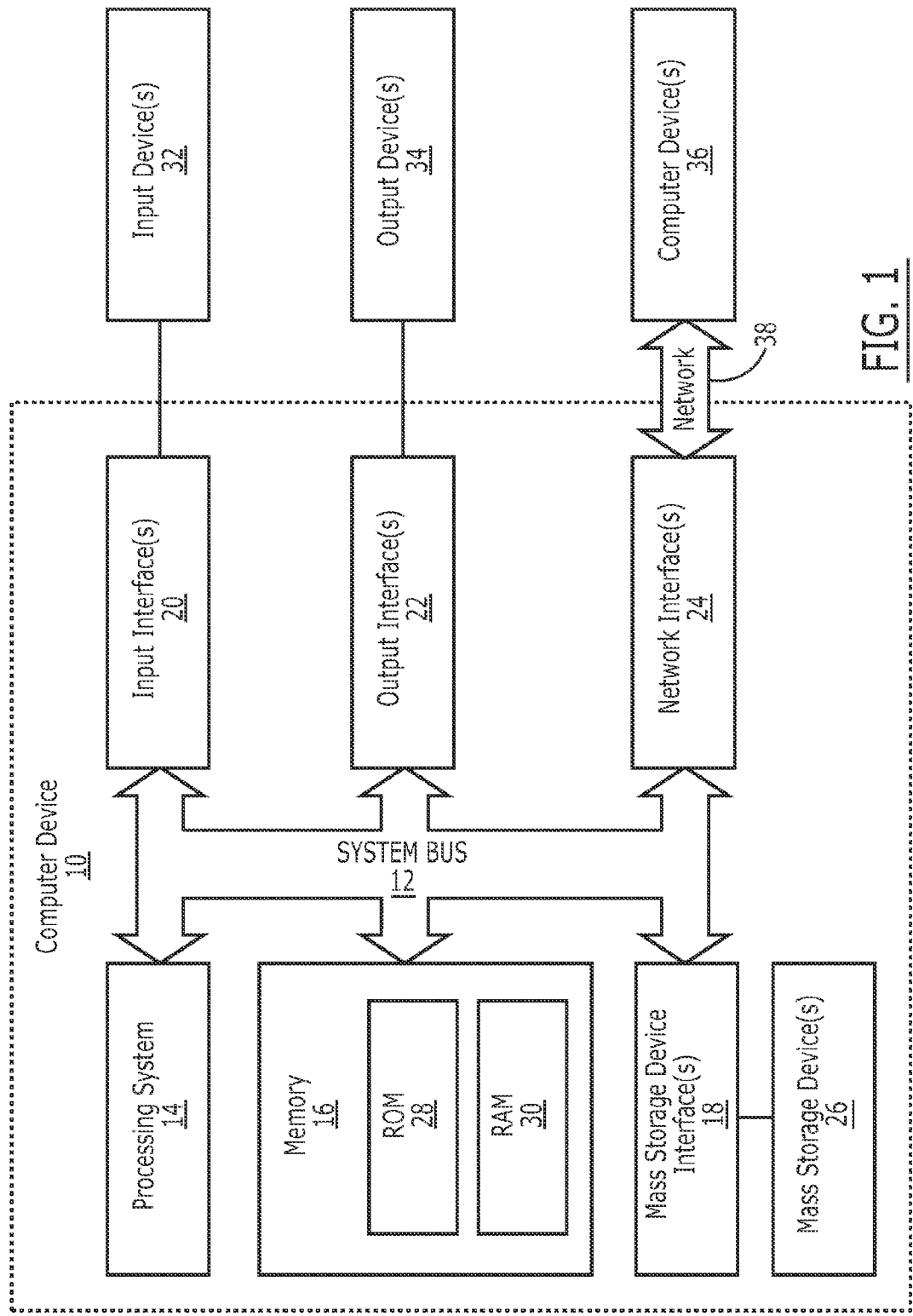
FIG. 1 illustrates a block diagram of a suitable computer operating environment for embodiments of the present invention.

The present invention relates to systems and methods for environmental control. One embodiment of the present invention relates to a solar affected environmental control system. The system includes a set of input devices, a priority device, an output device, and a control module. The input devices measure environmental values such as temperature, light, environmentally generated water heat, and environmentally generated electricity. The input devices may also be used to measure and record time of day, season, etc. The priority device interfaces with a user to define a goal that corresponds to a hierarchy of environmental objectives. For example, the goal may define temperature, visual light, and then environmentally generated electricity as the hierarchy in which the user wishes to prioritize the environmental objectives. The output device is an adjustable solar module that has an effect on the environmental values. For example, a rotatable skylight mounted panel may have an adjustable effect on both temperature and visual light, depending on the angle of rotation. The control module is an electrical device that includes a mathematical algorithm configured to correlate the environmental values and the user-defined goal so as to generate a set of output device settings. The control module is electrically coupled to the output device to facilitate adjustment according to the output device settings, so as to affect the environmental values in a manner consistent with the goal. A second embodiment of the present invention relates to a method for controlling a set of environmental values, including the acts of receiving environmental values, receiving a user-defined goal corresponding to a priority of environmental objectives, applying an algorithm to correlate the environmental values and the goal to generate a set of solar output device settings, and adjusting a solar output device according to the output device settings so as to affect the environmental values in a manner consistent with the goal. Also, while embodiments are described in reference to systems and methods for environmental control, it will be appreciated that the teachings of the present invention are applicable to other areas.

The following terms are defined as follows:

Solar affected—a device that is environmentally affected by the energy produced by the sun. For example, a photovoltaic solar panel is affected by the sun because it generates electricity as a result of solar exposure.

Environmental value—an alphanumeric quantitative value corresponding to data produced by an environmentally related sensor. For example, temperature is an environmental value produced by a thermometer. Likewise, electrical voltage/current produced by a photovoltaic solar panel is also an environmental value.

Environmental objective—an environmental condition such as an ambient indoor temperature of 68 degrees, an optimized solar electric generation, maximum solar produced visual light, etc.

Goal—a hierarchy of selected environmental objectives. For example, a priority list containing first optimum solar electric generation and second ambient indoor temperature of 68 degrees. In this example, the goal defines the primary condition to be achieved as solar electric generation and then an ambient temperature of 68 degrees.

The following disclosure of the present invention is grouped into two subheadings, namely "Operating Environment" and "Solar Affected Environmental Control System". The utilization of the subheadings is for convenience of the reader only and is not to be construed as limiting in any sense.

Operating Environment

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration. Alternatively, the invention may also be practiced in whole or in part manually following the same procedures.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA"), smart phone, or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Solar Affected Environmental Control System

Figure 2:
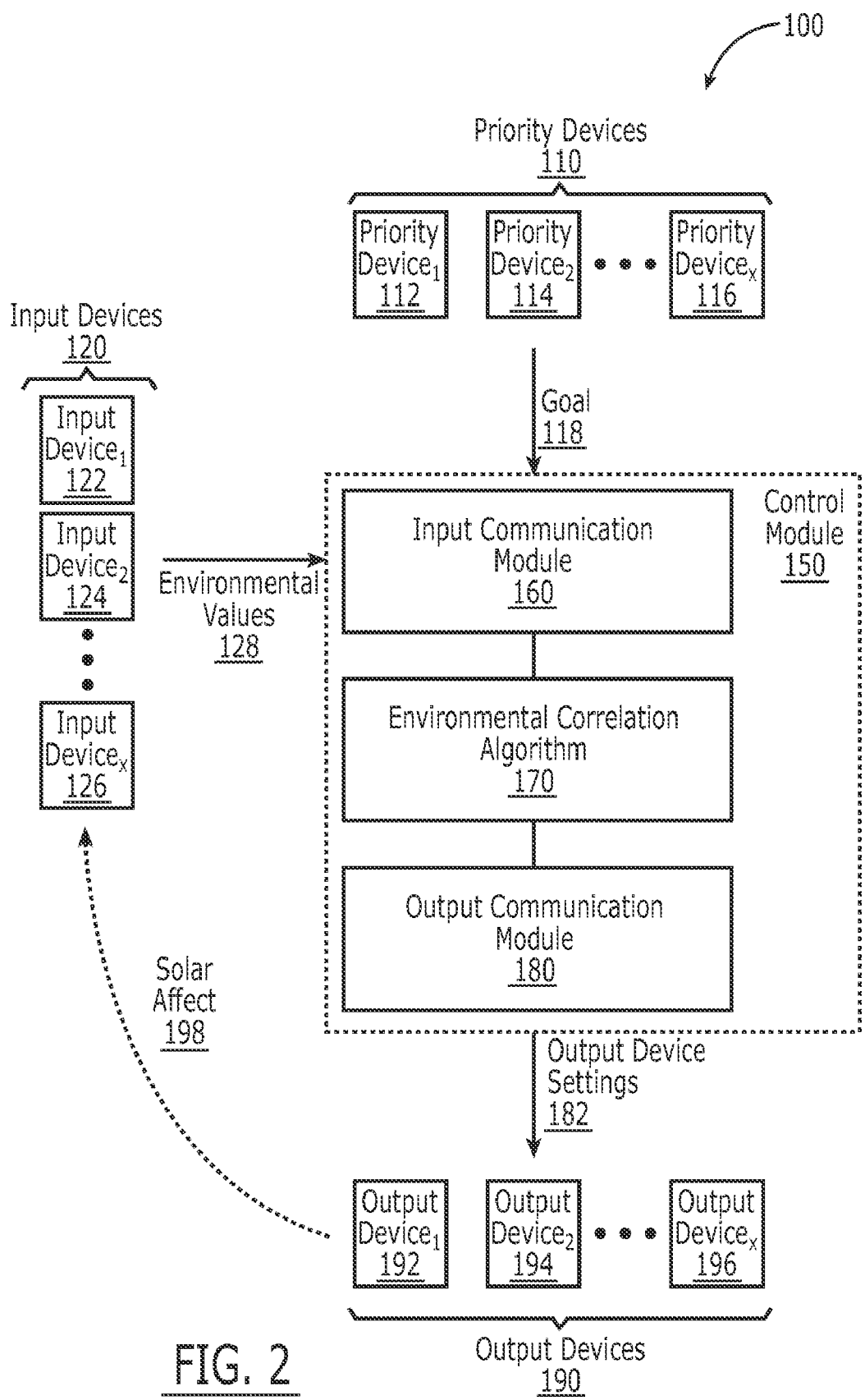
FIG. 2 illustrates a schematic block diagram of a solar affected environmental control system in accordance with one embodiment of the present invention.

Reference is initially made to FIG. 2, which illustrates a schematic block diagram of a solar affected environmental control system in accordance with one embodiment of the present invention, designated generally at 100. The system 100 includes a set of input devices 120, a set of priority devices 110, a set of output devices 190, and a control module 150. The input devices 120, priority devices 110, and output devices 190 may include one or more hardware and/or software devices coupled to the control module via various methodologies. For purposes of illustration, the input devices 120, priority devices 110, and output devices 190 are represented as an open ended set, meaning that they may include any number of devices. Examples of particular devices are illustrated and described with reference to FIG. 3.

The illustrated priority devices 110 include a first priority device 112, a second priority device 114, and a final priority device 116. As discussed above, the set of priority devices 110 may include any number of individual devices. The priority devices interface with a user to define a goal 118. The goal is a priority list of one or more environmental objectives. Each priority device may enable a user to select one or more desired environmental objectives and prioritize them according to preference. The interface may be any form of software or hardware that facilitates this user input. Examples include, a graphical user interface (GUI), physical keypad, dial, etc. In addition, the priority devices may be located locally or remotely with respect to the remainder of the system 100. Various communication systems such as the Internet may be utilized to enable remote data coupling. For example, serial, Ethernet, Wireless Ethernet may be utilized. Likewise, various technologies may be implemented to facilitate particular types of data transmission such as electrical, optical, radio frequencies, microwaves, etc.

The illustrated input devices 120 include a first input device 122, a second input device 124, and a final input device 126. As discussed above, the set of input devices 120 may include any number of individual devices. The input devices 120 measure environmental parameters to quantify environmental values 128. The environmental parameters relate to conditions such as temperature, electricity, and humidity. Each input device will measure one or more independent environmental values 128. The values may be directly related to the environment that the system 100 is controlling or indirectly related to an output device's performance at affecting the environment. For example, since humidity has an effect on the device's performance at electrical solar conversion, an input device may measure the humidity in a photovoltaic solar electrical device.

The control module 150 is data coupled to the priority devices 110 and input devices 120 to receive the goal 118 and independent environmental values 128, respectively. The control module 150 further includes an input communication module 160, an environmental correlation algorithm 170, and an output communication module 180. The input and output communication modules incorporate numerous hardware and software communication interfaces. Various well known technologies may be implemented to facilitate any form of data communication. For example, wireless, encryption, compression, etc. may all be incorporated in the data couplings. The environmental correlation algorithm utilizes a mathematical scheme to correlate the environmental values 128 with the goal 118 to produce the output device settings 182. Since the environmental values 128 generally include a plurality of different measurements and the goal often includes a plurality of environmental objectives, the algorithm must facilitate complex dynamic adjustment capabilities. For example, as the temperature changes to a prioritized value, a dynamic algorithm must respond by adjusting the output device settings 182 so as to accomplish the subsequent environmental objective contained in the goal 118.

The illustrated output devices 190 include a first output device 192, a second output device 194, and a final output device 196. As discussed above, the set of output devices 190 may include any number of individual devices. One of the output devices is solar affected meaning that its performance is directly related to the sun. Examples of solar affected, output devices include photovoltaic solar panels, solar hydrothermal panels, skylights, etc. The output devices 190 are data coupled to the control module 150 so as to be dynamically adjusted by the output device settings 182. For example, if the output device settings 182 include rotating a photovoltaic solar panel output device perpendicular to the sun, the photovoltaic solar panel will dynamically adjust in accordance with the output device settings. The output devices 190 have a solar effect 198 on one or more of the conditions measured by the input devices 120. This effect may be in the form of changing the environmental values. For example, opening a rotatable skylight output device may allow more air flow into an interior region, thereby changing the ambient temperature which may be one of the conditions measured by the input devices 120. Alternatively, rotating a photovoltaic solar panel may increase its solar affected performance at converting solar energy into electricity, which may be one of the conditions measured by the input devices 120.

Figure 3:
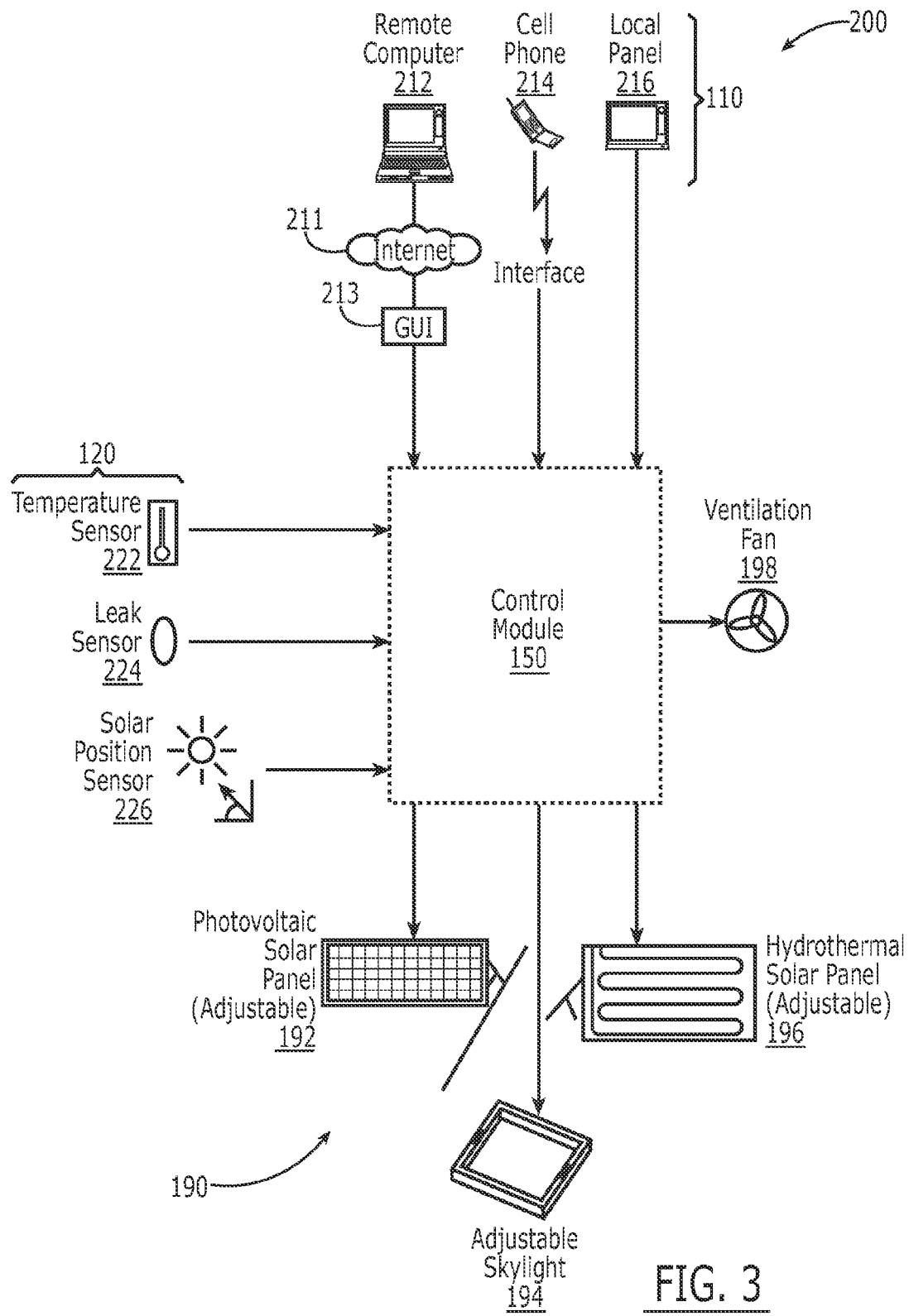
FIG. 3 illustrates a detailed device block diagram of the solar affected environmental control system illustrated in FIG. 1.

Reference is next made to FIG. 3, which illustrates a detailed device block diagram of the solar affected environmental control system illustrated in FIG. 1, designated generally at 200. Various examples of priority devices 110, input devices 120, and output devices 190 are illustrated. It will be appreciated that numerous other devices may also be used with solar affected environmental control systems in accordance with embodiments of the present invention. The illustrated priority devices 110 include a remote computer 212, a cell phone 214, and a local panel 216. The remote computer 212 is coupled to the control module 150 via the Internet 211 and a GUI 213. The remote computer 212 may be utilized by a user to remotely control a solar affected environment. For example, if the environment is a residential cabin, the user may control environmental aspects of the cabin from a remote location, including a solar affected condition such as the cabin's electrical generation and storage parameters, via adjustable photovoltaic solar panels. Likewise, the cell phone 214 is coupled to the control module 150 via a wireless interface. An input panel may also be disposed within the system to enable local input of environmental objectives. Various other graphical, manual, and physical human interfaces may be utilized to allow a user to define a hierarchy of environmental objectives.

The illustrated input sensors 120 include a temperature sensor 222, a leak sensor 224, and a solar position sensor 226. The temperature sensor 222 may be any type of electrical thermistor that measures ambient temperature and produces an environmental value. It will be appreciated that the temperature sensor 222 and other input devices 120 may include a power supply, communication system, and other components. The leak sensor 224 detects an environmental value corresponding to the humidity in a particular region or output device. For example, the humidity detector may detect the humidity in an interior space, or it may detect humidity within a photovoltaic solar panel that affects its solar electrical conversion performance. The solar position sensor 226 (may also be referred to as a zero-position sensor) detects a value corresponding to the position of the sun with respect to another object. For example, the position may correspond to a particular output device or the earth itself. Various other sensing devices may be included that sense environmental values directly or indirectly corresponding to the region controlled by the system 200. The input devices 120 may be positioned to measure values corresponding directly to the perceived environment of a region or on a particular output device's performance at harnessing the environment (ie. electrical power generation or water temperature increase).

The illustrated output devices 190 include a photovoltaic solar panel 192, adjustable skylight 194, hydrothermal solar panel 196, and a ventilation fan 198. The photovoltaic solar panel 192 converts solar energy into electricity and is adjustable according to one or more parameters that can be configured by the output device settings. The parameters may include axis of rotation, internal ventilation fan speeds, etc. The adjustable skylight 194 is positioned on an exterior wall or roof of an enclosed region and is adjustable according to one or more parameters. The hydrothermal solar panel 178 converts solar energy into water heat and may further include various pumps and power supplies. The ventilation fan 198 is positioned in proximity to the controlled environment or one of the output devices to increase airflow to a particular region. In addition, the multi-panel solar system illustrated in FIG. 11 may be incorporated as an output device and remain consistent with the teachings of the present invention.

Figure 4:
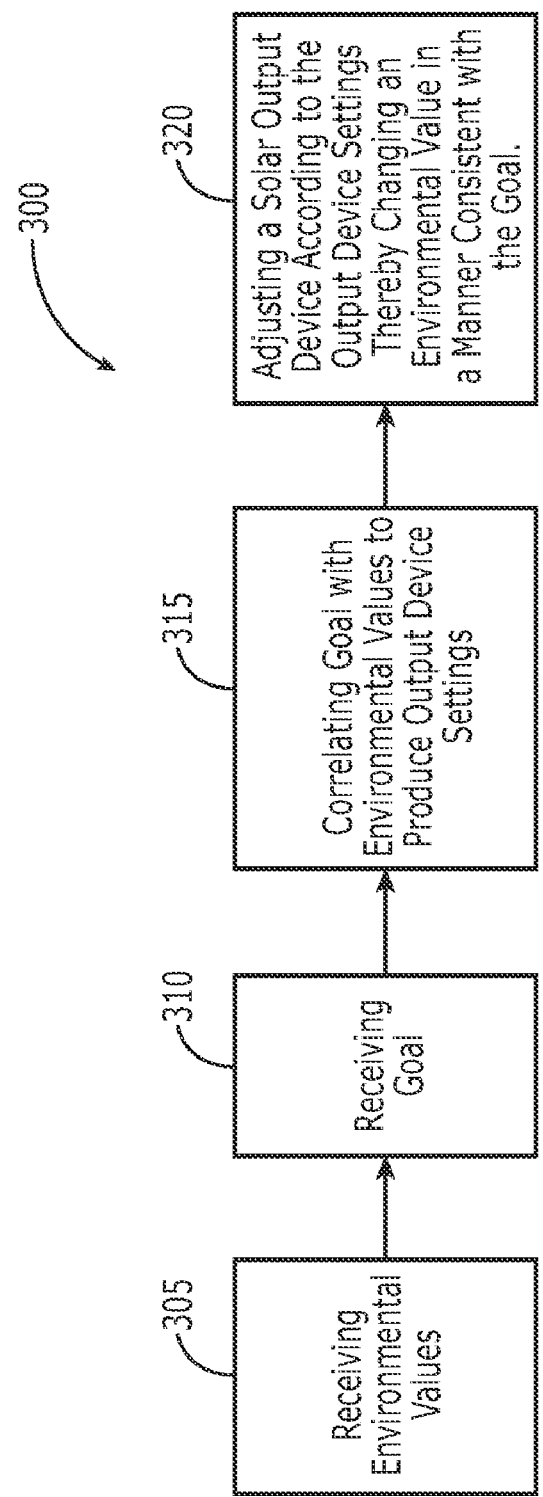
FIG. 4 illustrates a flow chart of a method for controlling an environment in accordance with a second embodiment of the present invention.

Reference is next made to FIG. 4, which illustrates a flow chart of a method for controlling an environment in accordance with a second embodiment of the present invention, designated generally at 300. The illustrated method is from the perspective of a control module or system. The method 300 includes receiving a set of environmental values, act 305. As discussed above, these environmental values may correspond to various direct environmental conditions or environmentally affected and solar affected conditions. A goal is received, act 310. The goal is a user-defined goal input that includes a priority list or hierarchy of environmental objectives. The received goal is correlated with the received environmental values to produce a set of output settings, act 315. The correlation utilizes a mathematical algorithm to adjust the output device settings so as to achieve the environmental objectives according to the hierarchy contained within the goal. The correlation may include receiving status information as to the identity and adjustability of the output devices. The correlation may include comparing the environmental values with the environmental objectives contained within the goal. The correlating may include comparing the environmental values with default environmental objectives not specified in the goal. A solar output device is then adjusted according to the output device settings, thereby changing an environmental value in a manner consistent with the goal, act 320. The adjustment of a solar output device may include adjusting other solar and non-solar output devices according to the output device settings. The solar output device is a solar affected output device including but not limited to a photovoltaic solar panel, a hydrothermal solar panel, a multi-panel system, etc.

Figure 5:
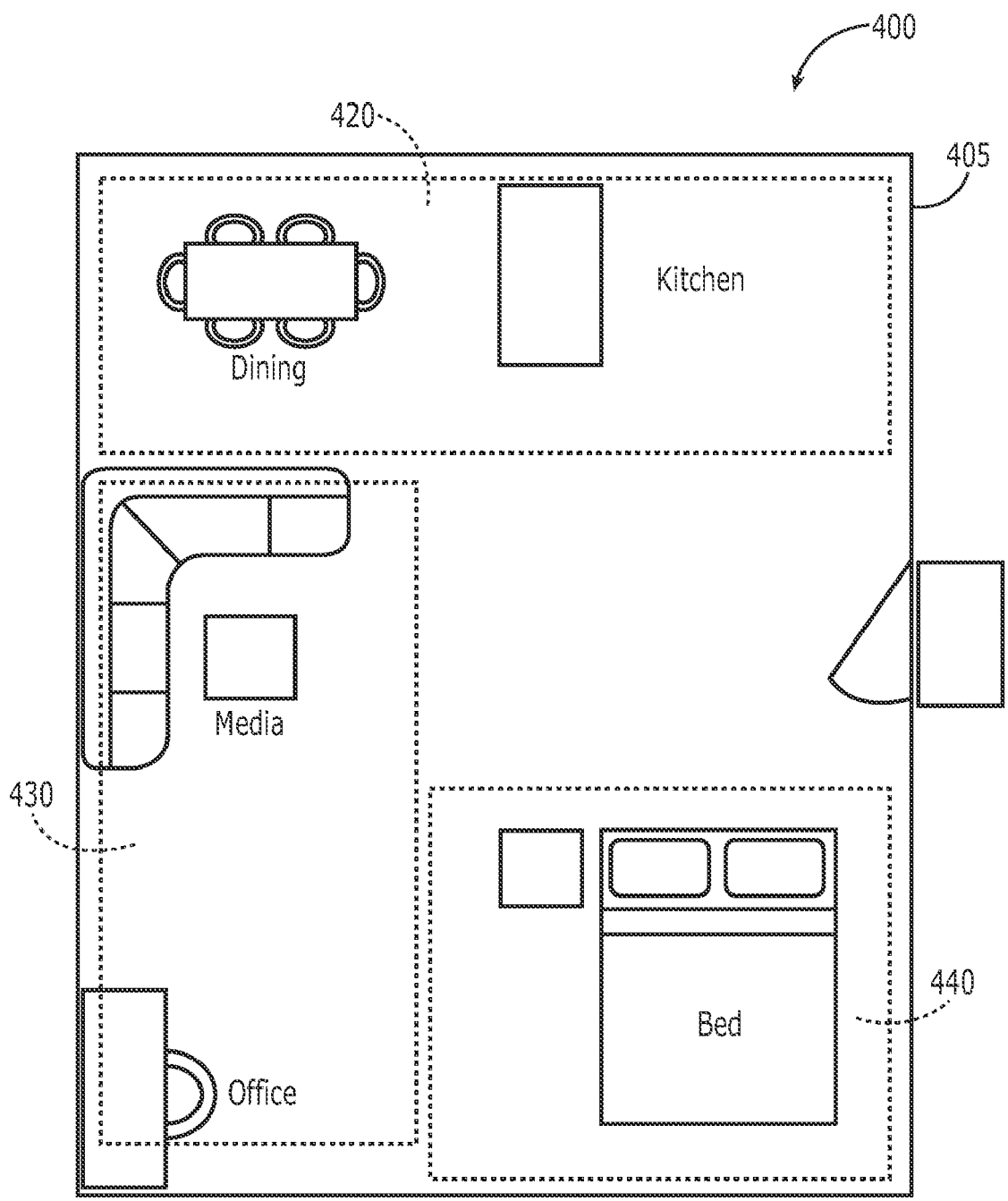
FIG. 5 illustrates a residential multi-zone environment control region in accordance with embodiments of the present invention.

Reference is next made to FIG. 5, which illustrates a residential multi-zone environment control region in accordance with embodiments of the present invention, designated generally at 400. The environmental objectives contained within the goal may be further delineated according to location zones. The environment control region 400 is a small residential region 405 including a kitchen/dining zone 420, media/office zone 430, and a sleeping zone 440. Various environmental objectives may be assigned according to specific zones. For example, the environmental objectives for the kitchen/dining zone 420 may include maximum visual solar light and an ambient temperature of 65 degrees Fahrenheit. Whereas the environmental objectives for the media/office zone 430 may include minimum visual light, maximum solar electrical generation, and an ambient temperature of 70 degrees Fahrenheit. Various types of location zones may be utilized, including three dimensional, multi-story, overlapping, exterior, etc.

Figure 6:
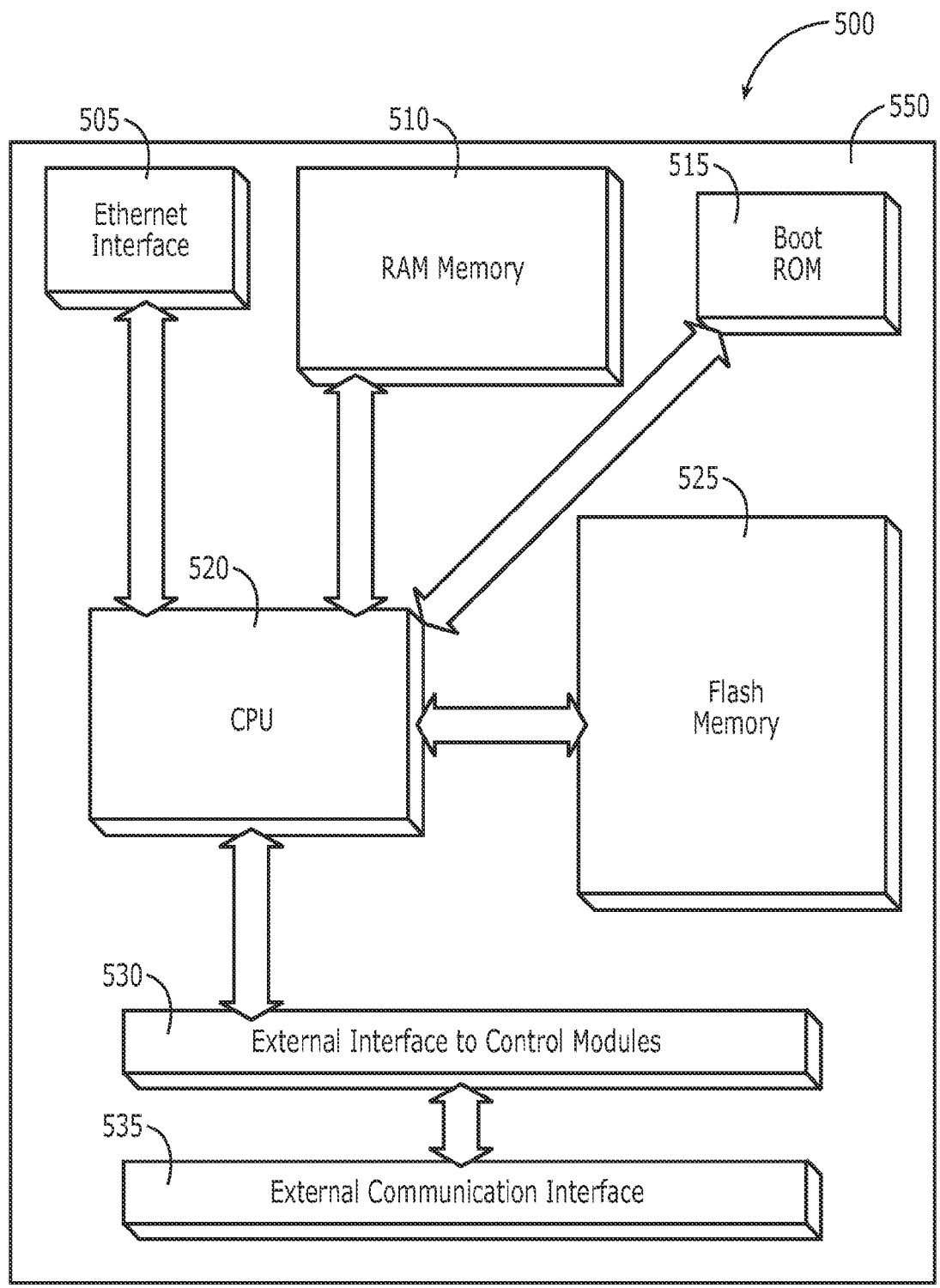
FIG. 6 illustrates a schematic block diagram of a main circuit board in accordance with the one implementation of an embodiment of the present invention illustrated in FIGS. 6-10.
Figure 7:
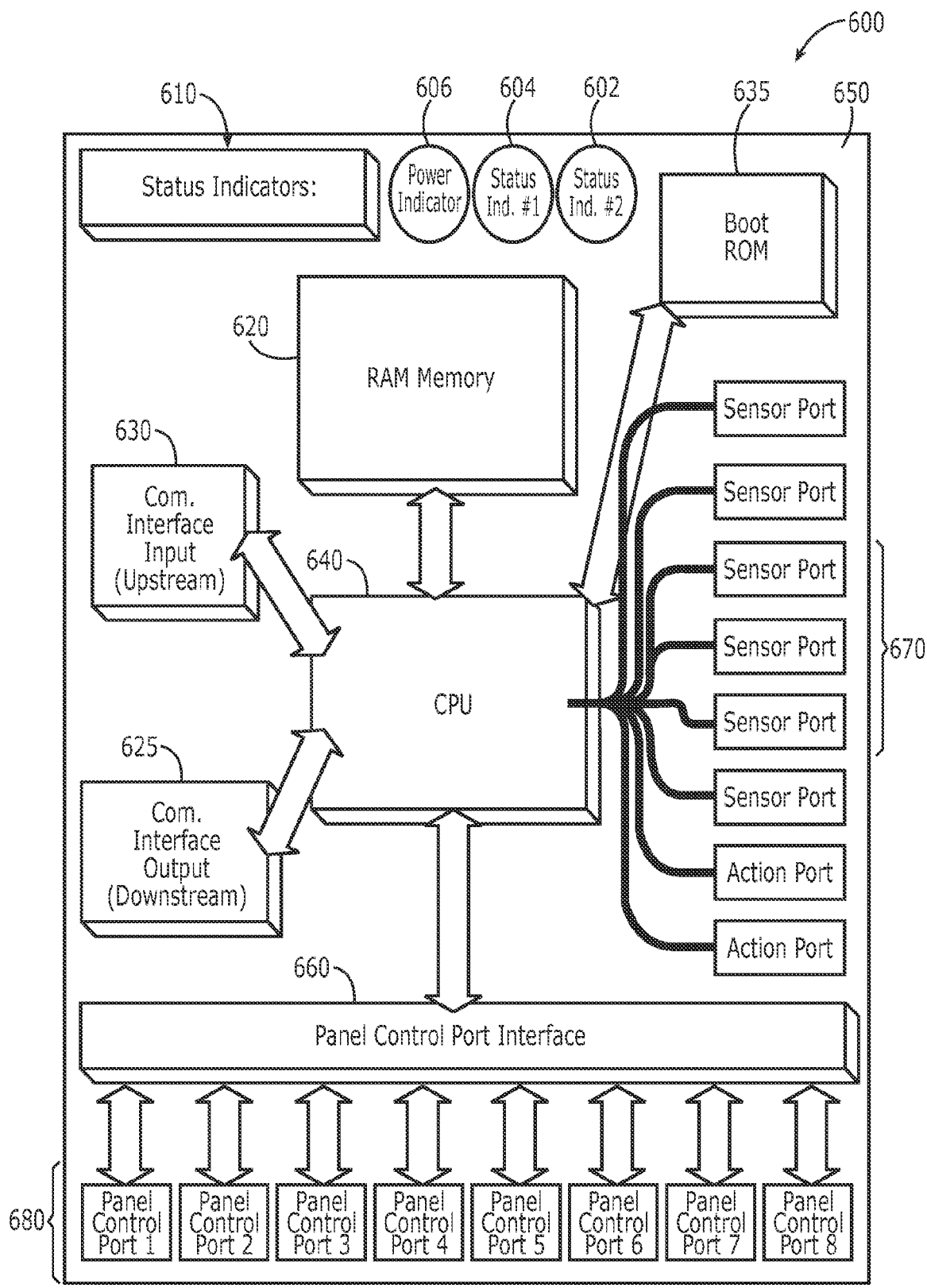
FIG. 7 illustrates a schematic block diagram of an interface circuit board in accordance with the one implementation of an embodiment of the present invention illustrated in FIGS. 6-10.
Figure 8:
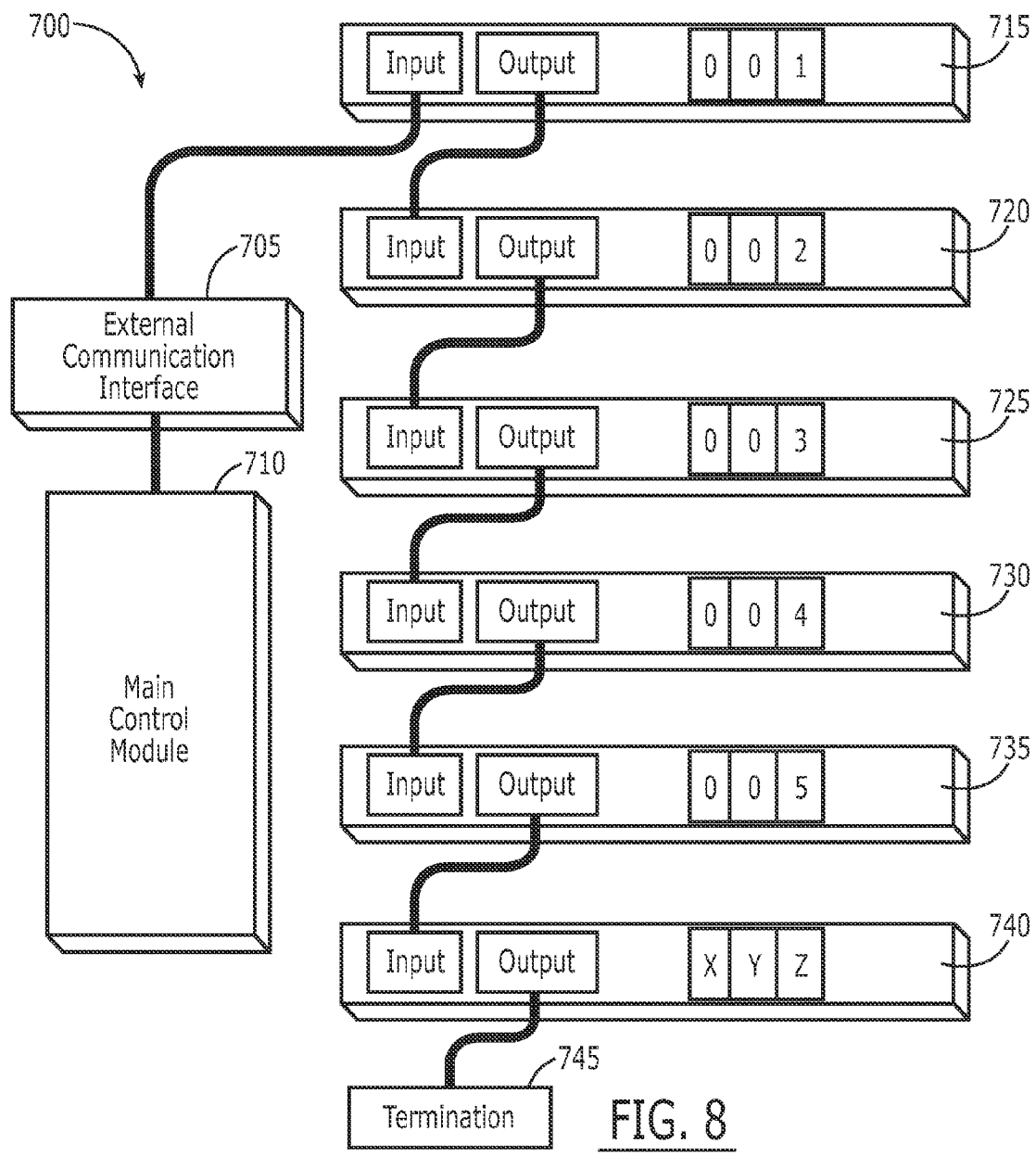
FIG. 8 illustrates a schematic block diagram of a control module, interface, and a series of output devices in accordance with the one implementation of an embodiment of the present invention illustrated in FIGS. 6-10.
Figure 9:
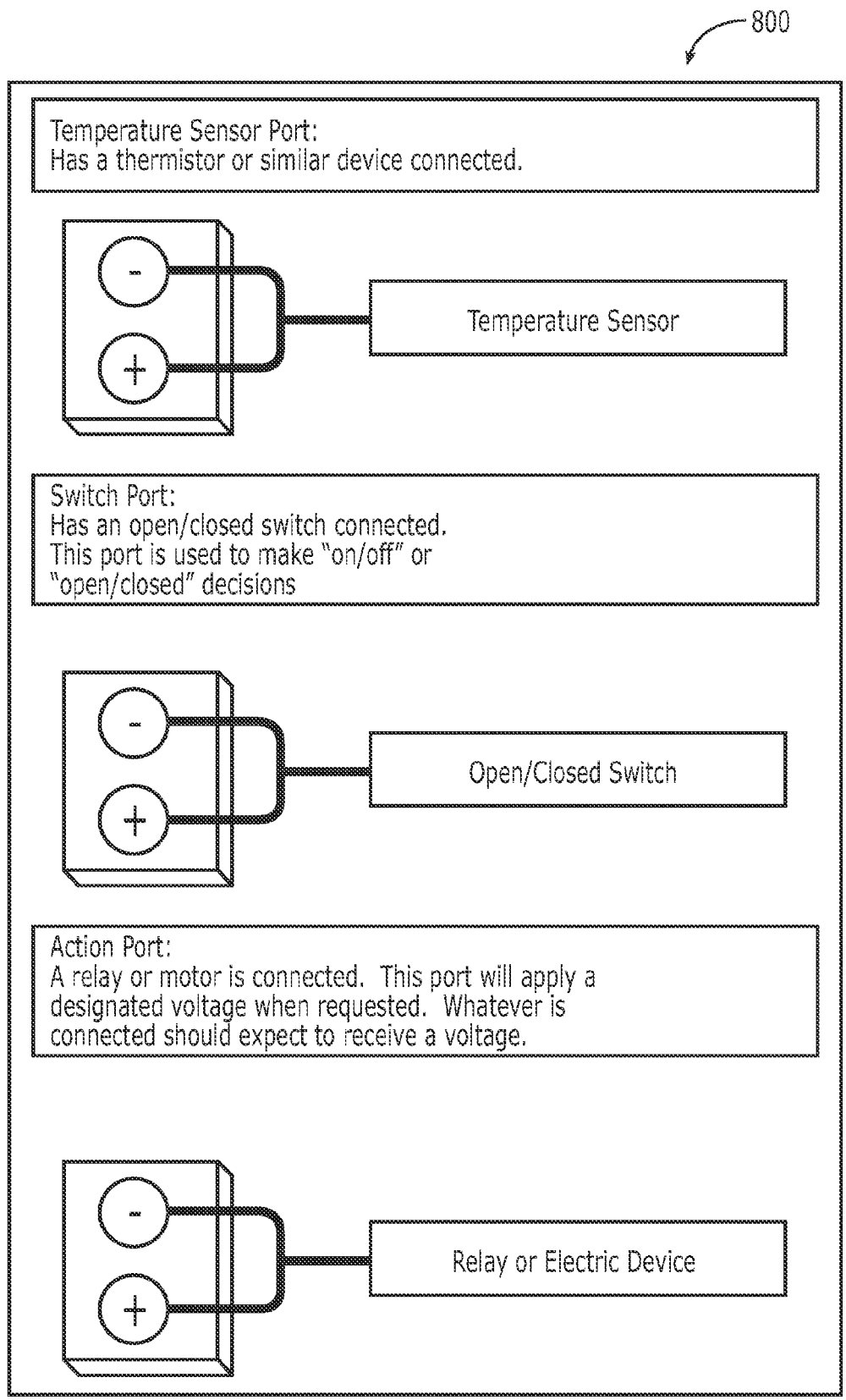
FIG. 9 illustrates three electrical data coupling schematics for use on an input sensor device in accordance with the one implementation of an embodiment of the present invention illustrated in FIGS. 6-10.
Figure 10:
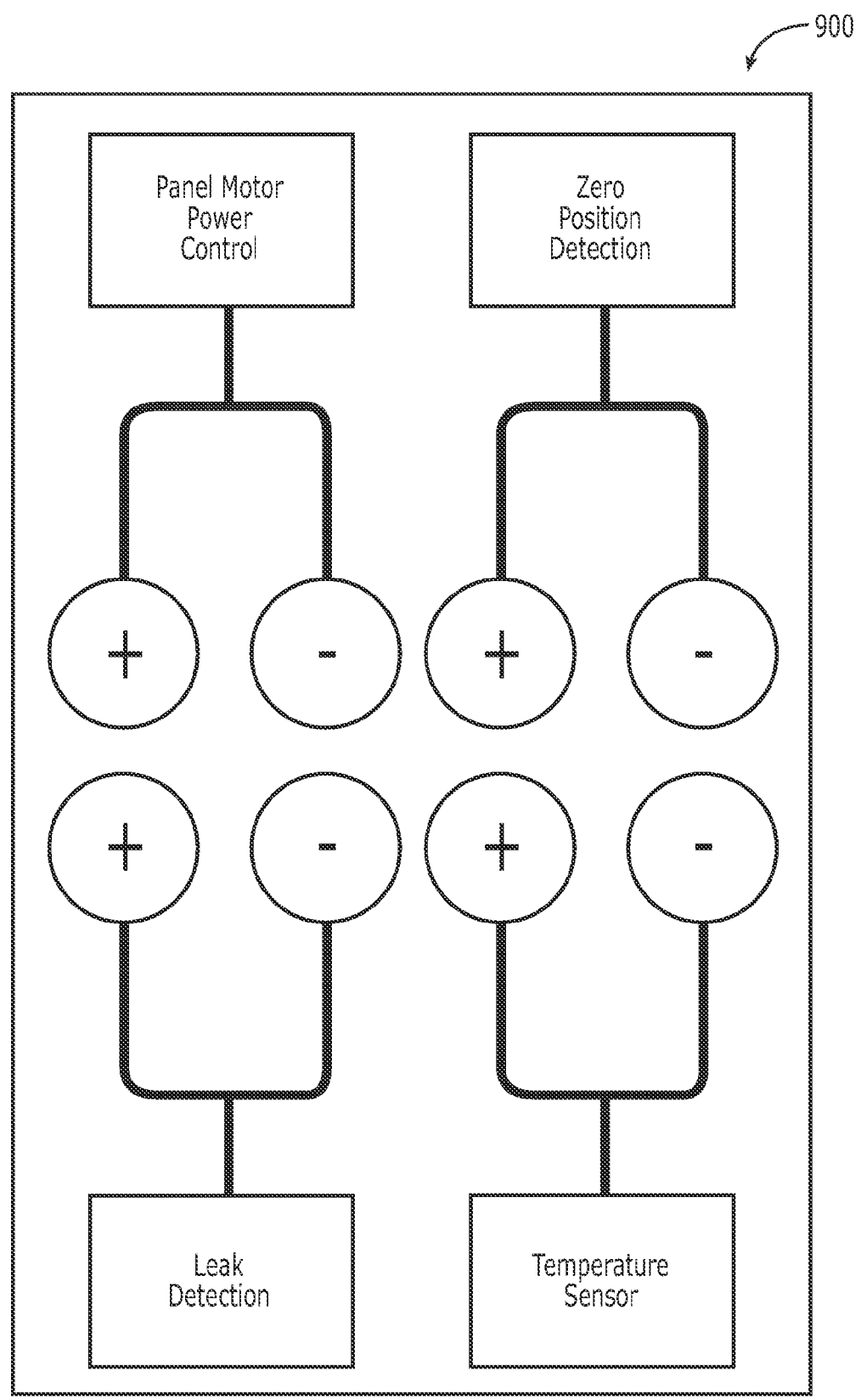
FIG. 10 illustrates a data coupling schematic for use on an output solar panel device in accordance with the one implementation of an embodiment of the present invention illustrated in FIGS. 6-10.

Reference is next made to FIGS. 6-10, which illustrate a series of schematic diagrams for a particular solar affected control system implementation in accordance with embodiments of the present invention. The illustrated implementation incorporates serial data communication. FIG. 6 is a schematic block diagram of a main circuit board, designated generally at 500. The main circuit board includes an Ethernet interface 505, a random access memory (RAM) module 510, a boot RAM module 515, a central processing unity (CPU) module 520, a flash memory module 525, an external interface to control modules 530, and an external communication module 535. FIG. 7 is a schematic block diagram of an interface circuit board, designated generally at 600. The interface board includes a set of status indicators 610 (power 606, status #1 604, status #2 606), a boot ROM 635, a RAM memory module 620, a serial upstream input communication module 630, a serial downstream output communication module 625, a CPU 640, a set of sensor and action ports 670, a panel control port interface 660, and a set of panel control ports 680. The referenced panel(s) may be any form of solar affected panel including the multi-panel system illustrated in FIG. 11. FIG. 8 is a schematic block diagram illustrating the serial data connection scheme of a control module, interface, and a series of output solar affected panel devices, designated generally at 700. The scheme includes the control module 710, external communication interface 705, first output device 715, second output device 720, third output device 725, fourth output device 730, fifth output device 735, final output device 740, and a termination module 745. It will be appreciated that any number of output devices may be utilized. FIG. 9 illustrates three electrical data coupling schematics for use on an input sensor device, designated generally at 800. FIG. 10 illustrates a data coupling schematic for use on an output solar affected panel device, designated generally at 900.

Figure 11:
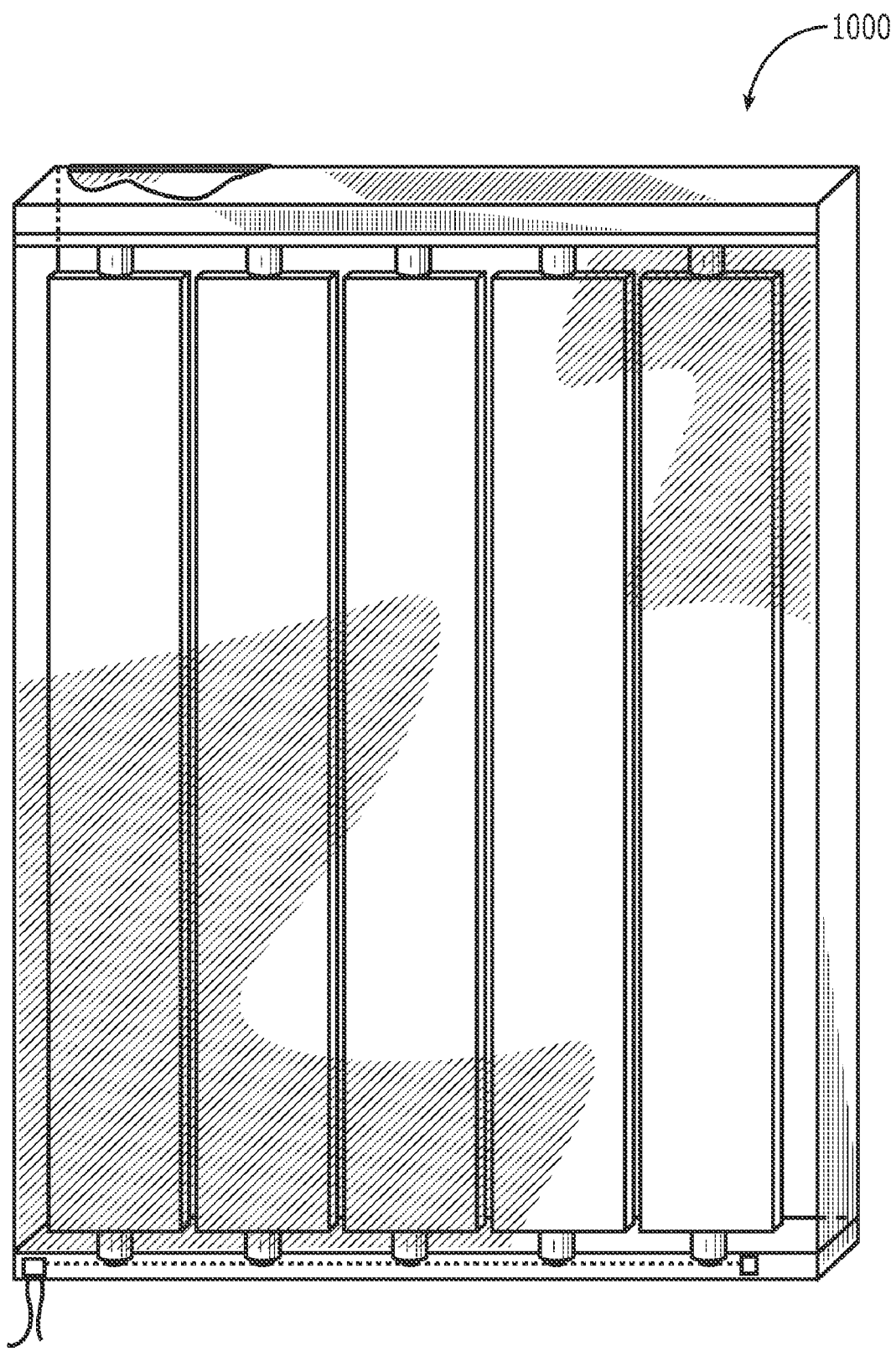
FIG. 11 illustrates a cross-sectional view of a multi-panel solar system which may be utilized as an output device in accordance with system embodiments of the present invention.

Reference is next made to FIG. 11, which illustrates a cross-sectional view of a multi-panel solar system that may be utilized as an output device in accordance with system embodiments of the present invention, designated generally at 1000. The system includes a plurality of rotatable panels supported within an enclosed substantially transparent structure and a rotation system that enables the panels to rotate. The system 1000 may also include input devices such as temperature sensors, humidity sensors, electrical sensors, etc. that relate to environmental conditions within the system 1000 or the performance of the system. The panels may include solar energy conversion technologies such as photovoltaic and hydrothermal.

Various other embodiments have been contemplated, including combinations in whole or in part of the embodiments described above.

What is claimed is:

1. An environmental control system comprising:
a plurality of input devices individually configured to measure independent environmental values;
a priority device configured to receive a user-defined goal that defines a priority of environmental objectives;
at least one adjustable output device that has an effect on one or more of the independent environmental values, and wherein one of the at least one adjustable output devices is solar affected such that an adjustment of the output device with respect to the sun causes a direct quantitative effect on one or more of the independent environmental values;
wherein the at least one adjustable output device includes a photovoltaic solar panel;
wherein the independent environmental values include an electrical current transmitted from the photovoltaic solar panel and an environmental parameter external of the photovoltaic solar panel, and wherein the photovoltaic solar panel is solar affected such that an adjustment of the photovoltaic solar panel with respect to the sun causes a direct quantitative effect on both the electrical current transmitted from the photovoltaic solar panel and an environmental parameter external of the photovoltaic solar panel including at least one of humidity and temperature;
wherein the goal includes optimizing the electrical current; and
a control module further comprising:
an input communication module configured to receive the independent environmental values from the plurality of input devices and to receive the goal from the priority device;
an algorithm configured to mathematically correlate the goal and the independent environmental values to produce a set of output device settings; and
an output communication module configured to transmit the output device settings to the at least one adjustable output device so as to adjust the at least one adjustable output device in a manner that causes the independent environmental values to be affected in a manner consistent with the goal.

2. The system of claim 1, wherein the independent environmental values correspond to internal and external environmental parameter of a particular enclosed structure.

3. The system of claim 1, wherein the plurality of input devices includes at least two of a temperature sensor, water pressure sensor, electricity sensor, and a light sensor.

4. The system of claim 1, wherein the priority device includes at least one of a graphical web interface, a multi-position switch, a touchpad, and a keyboard.

5. The system of claim 1, wherein the user-defined goal includes a hierarchy of at least two environmental objectives, and wherein the at least two environmental objectives include at least two of visual light, ambient temperature, solar water heat, and solar electrical generation.

6. The system of claim 5, wherein the user-defined goal includes multiple priority lists of environmental objectives corresponding to a plurality of location based zones.

7. The system of claim 1, wherein the at least one adjustable output device further includes at least one additional of the following: a rotatable solar panel system and a hydrothermal solar panel.

8. The system of claim 7, wherein the at least one adjustable output device further includes at least one additional of ventilation fans, water pumps, switches, and motors.

9. The system of claim 1, wherein the at least one adjustable output device includes a multi-panel solar system comprising:
   a plurality of rotatable panels disposed in alignment with one another, wherein the axis of rotation of each of the plurality of panels is perpendicular to the axis at which the panels are disposed in alignment;
   a rotation system mechanically coupled to the plurality of panels that enables the coordinated rotation of all of the panels about parallel axis of rotation; and
   a housing encasing the plurality of rotatable panels and the rotation system, wherein the housing mechanically supports the relative positioning of the plurality of rotatable panels and insulates thermal conduction transmission of the plurality of panels external to the housing, and wherein the housing includes a thermally insulating and visually transparent member on opposite sides of the plurality of panels.

10. The system of claim 1, wherein the at least one adjustable output devices include at least two output devices disposed on a multi-panel rotatable solar system including a rotatable solar affected panel and at least one of a ventilation fan and a water pump, and wherein one of the at least one input devices is disposed on the multi-panel rotatable solar system and includes a position sensor that senses the relative positioning of the rotatable solar affected panel in relation to the sun.

11. A method for controlling an environment comprising the acts of:
   receiving a plurality of independent environmental values;
   receiving a user-defined goal that defines a priority of environmental objectives;
   correlating the user-defined goal and the independent environmental values to produce a set of output device settings;
   adjusting at least one adjustable solar affected output device with respect to the sun in a manner that causes the independent environmental values to be affected in a manner consistent with the user-defined goal, wherein adjustment of the solar affected output device with respect to the sun causes a direct quantitative effect on one or more of the independent environmental values;
   wherein the at least one adjustable solar affected output device includes a photovoltaic solar panel;
   wherein the independent environmental values include an electrical current transmitted from the photovoltaic solar panel, and an environmental parameter external of the photovoltaic solar panel, and wherein the adjustment of the photovoltaic solar panel with respect to the sun causes a direct quantitative effect on both the electrical current transmitted from the photovoltaic solar panel and an environmental parameter external of the photovoltaic solar panel including at least one of humidity and temperature; and
   wherein the goal includes optimizing the electrical current.

12. The method of claim 11, wherein the act of receiving a plurality of independent environmental values includes wirelessly data coupling a control module with at least one environmental input measurement device and receiving an environmentally related data value.

13. The method of claim 11, wherein the act of receiving a user-defined goal that defines a priority of environmental objectives further includes providing a human interface to facilitate a user-defined goal hierarchy and selection process.

14. The method of claim 12, wherein the human interface is a graphical user selection interface and is transmitted to a user via a dynamic communication medium.

15. The method of claim 12, wherein the user-defined goal includes multiple priority lists of environmental objectives corresponding to a plurality of location based zones.

16. The method of claim 11, wherein the act of adjusting at least one adjustable solar affected output device in a manner that causes the independent environmental values to be affected in a manner consistent with the user-defined goal further includes rotating a multi-panel solar system with respect to the orientation of the sun so as to change at least one of the independent environmental values.

17. The method of claim 11, wherein the act of correlating the user-defined goal and the independent environmental values to produce a set of output device settings includes applying a mathematical algorithm.

18. The method of claim 11 further including providing an environmental control system comprising:
   a plurality of input devices individually configured to measure independent environmental values;
   a priority device configured to receive a user-defined goal that defines a priority of environmental objectives;
   at least one adjustable output device that has an effect on one or more of the independent environmental values, and wherein one of the at least one adjustable output devices is solar affected; and
   a control module further comprising:
      an input communication module configured to receive the independent environmental values from the plurality of input devices and to receive the goal from the priority device;
      an algorithm configured to mathematically correlate the goal and the independent environmental values to produce a set of output device settings; and
      an output communication module configured to transmit the output device settings to the at least one adjustable output device so as to adjust the at least one adjustable output device in a manner that causes the independent environmental values to be affected in a manner consistent with the goal.

19. An environmental control system comprising:
   a plurality of input devices individually configured to measure independent environmental values, wherein the plurality of input devices include at least one of a temperature sensor, water pressure sensor, water temperature sensor, electricity sensor, and a light sensor;
   a priority device configured to receive a user-defined goal that defines a priority of environmental objectives, wherein the available environmental objectives include at least one of visual, temperature, solar water heat, and solar electrical generation;
   at least one adjustable output device that has an effect on one or more of the independent environmental values, and wherein one of the at least one adjustable output devices is solar affected such that an adjustment of the output device with respect to the sun causes a direct quantitative effect on one or more of the independent environmental values; and
   a control module further comprising:

an input communication module configured to receive the independent environmental values from the plurality of input devices and to receive the user-defined goal from the priority device;

an algorithm configured to mathematically correlate the user-defined goal and the independent environmental value to produce a set of output device settings;

an output communication module configured to transmit the output device settings to the at least one adjustable output device so as to adjust the at least one adjustable output device in a manner that causes the independent environmental values to be affected in a manner consistent with the user-defined goal;

wherein the at least one adjustable output device includes a photovoltaic solar panel;

wherein the independent environmental values include an electrical current transmitted from the photovoltaic solar panel, and an environmental parameter external of the photovoltaic solar panel, and wherein the photovoltaic solar panel is solar affected such that an adjustment of the photovoltaic solar panel with respect to the sun causes a direct quantitative effect on both the electrical current transmitted from the photovoltaic solar panel and an environmental parameter external of the photovoltaic solar panel including at least one of humidity and temperature; and wherein the goal includes optimizing the electrical current.

20. The method of claim 19, wherein the at least one solar affect output device further includes at least one additional of a solar hydrothermal panel and a skylight.

* * * * *